Jan. 1, 1957 G. CREMER 2,776,163
SUCTION-HEAD FOR USE WITH A VACUUM CONVEYOR PLANT
Filed April 23, 1952 3 Sheets-Sheet 1

INVENTOR
Gottfried Cremer
by Malcolm W. Fraser
attorney

Jan. 1, 1957  G. CREMER  2,776,163
SUCTION-HEAD FOR USE WITH A VACUUM CONVEYOR PLANT
Filed April 23, 1952  3 Sheets-Sheet 3

INVENTOR
Gottfried Cremer

2,776,163
SUCTION-HEAD FOR USE WITH A VACUUM CONVEYOR PLANT

Gottfried Cremer, Junkersdorf, near Köln, Germany

Application April 23, 1952, Serial No. 283,849

13 Claims. (Cl. 294—64)

This invention relates to a suction-head for use with a vacuum conveyor plant especially but not essentially for mouldings of material which is sensitive to mechanical stresses, as for example mouldings in a plastic or semi-plastic state.

The suggestions that have so far been made to raise and transport shaped bodies possessing such characteristics by means of conveyor-plants provided with suction-heads, are in the main limited to the application of this principle to the transport of small mouldings of slight weight only. This method of conveyance has not, however, so far been applied to ceramic (or similar) mouldings of rather larger dimensions and correspondingly greater weight, for the reason that experts deemed it absolutely impossible, on account of the misshapings to be apprehended if this system were applied to unfinished pieces of work still in a plastic state.

Now, quite surprisingly, it has been recognised that such apprehensions have proved to be unfounded, and is now confirmed that the "holding" and conveyance of ceramic mouldings of quite large dimensions is quite practicable without incurring any risk of misshaping, when a suction-installation, or suction-head, is utilised, which corresponds in all respects to the proposed conditions.

This invention provides such a suction-head, and thereby opens up the possibility, for the ceramic industry in particular and generally for other industries that have to cope with similar problems, of securing the advantages of the vacuum conveyor-plant principle, consisting principally in the large service-capacity of such installation. It is of particular value in the case of the ceramic industry where it is absolutely vital to preserve ceramic materials from injury. This applies to mouldings of any shape whatsoever, regardless of whether they happen to be of uniform evenness, or of a form that diverges therefrom, as, for instance, unfinished roof-tiles. Such a suction-head is particularly suitable, for instance, for the conveyance in an upright position of tubular mouldings.

The construction of the new suction-head rests on the consideration that the suction-force causing adherence must exert its influence on as large a part as possible of the surface of the unfinished article which it "grips," under such conditions that these parts of the upper surface of the unfinished article that are not subjected directly to the effect of suction are not so extensive as to cease being self-supporting, taking into consideration their plastic state; and so that as far as concerns that part of the upper surface of the unfinished article subject to the influence of the suction-head, there is no bending upwards of the moulding under the influence of the negative pressure even in the case of comparatively large mouldings of considerable weight, which "bend" must be definitely avoided.

The new suction-head which complies with these conditions is of campanulate formation and has a packing element lying on a comparatively large surface of the moulding and corresponding to the contours thereof, consisting for instance of a strip (of, say, soft rubber) around the lower edges of the suction-head. In the case of unfinished articles of smaller dimensions the negative pressure acts directly on the moulding inside the surrounded chamber of the suction-head sealed in this manner; whilst, in the case of larger mouldings, where the suction-head covers a correspondingly larger surface of the moulding, there must be a strengthening of the moulding to counter-balance the influence of the negative pressure. In order to achieve this, a disc perforated by many holes and conforming to the contours of the surface of the moulding is used. It is preferable that the disc should not lie immediately up against the moulding, but that it should be provided on its nether side with a permeable cover of suitable material, for instance felt or similar substance, over which the siphoning power of the suction-head is transferred and distributed uniformly to the moulding, thus rendering it impossible that, even in the case of the negative pressure needed to hold the heavier mouldings, the moulding be bent upwards. The cover suggested likewise facilitates the easier disengagement of the moulding after switching off the vacuum. Instead of the permeable cover through which the suction power can operate, one may utilise various substances made of flexible material (which need not be permeable) spreading them evenly, and attaching them in such a manner, that those parts of the mouldings which are not strengthened do not exceed the admissible dimensions, and so that the vacuum, as far as possible, acts quite evenly upon the whole of the surface that is enclosed by the suction-head. The appropriate degree of negative pressure to be applied according to the varying weight of the mouldings, is comparatively low.

The use of this novel contrivance is by no means limited to conveyor installations designed for conveyance of lamellar bodies, with even, or uneven surfaces, such as plates, shaped bricks, roofing tiles and the like, but the application of this contrivance is also practicable to mouldings of different shapes.

In the case of tubular mouldings, the suction-head is formed in such a way that an annular space is formed between two outer packings over which space the suction effect extends and exercises its effect upon the ledge situated within the socket-attachment. In this particular instance, additional strengthening within the annular space is generally not essential.

In this case and in other ones with similar prior conditions the sealing rings may be arranged in a sloping position on the suction-head so that they snugly contact the edges of the tubular mouldings, sealing off the space that lies between these edges and over which the vacuum acts. The only condition is that the material used for the packing rings should consist of a material that is softer than that of the mouldings.

This method of construction greatly facilitates the application of this inventive idea to straight pipes and similar mouldings where there are no or only small smooth end-surfaces available.

For those cases in which one and the same moulding is to be conveyed repeatedly during the successive stages of processing, appropriate provision must be made for dismantling and re-assembling the suction mechanism. This causes not merely loss of time but constitutes a disadvantageous factor from the point of view of the absolute necessity for taking the greatest possible care of the article to be processed.

In accordance with the invention this is avoided by means of a bipartite formation of the suction head, so that the actual suction head which is to be attached to the moulding forms a base which is combined with a connecting piece which will be similar in all cases but will vary, of course, according to the different dimensions depending in turn upon the size and contours of the mouldings. This makes it possible (quite apart from the saving of material resulting from the fact that now only bases need be held in readiness in their requisite numbers and essential construction) to furnish any given number of mouldings with the suction head base, and to attach these to a single upper part for the purpose of successive transportation. The upper part is, for instance, suspended from the conveyor mechanism and conveys them after evacuation has been effected.

Already by this means an extraordinary speeding-up of the entire working processes is achieved. There are other advantages that must ensue therefrom. If, according to a further characteristic feature of the invention, the base of the suction head is constructed for example by the introduction of a non-return valve, so that it can be sealed off, then after removal of the top part the vacuum in the lower part is maintained, and the base remains firmly attached to the article to be processed. This provides a possibility for attachment or fastening thereto of other mechanical conveyor or like mechanisms, without exposing the sensitive article itself to the danger of being damaged in any way. Consequently, there is but a single evacuation subsequent to the mounting of the upper part of the head and the article subject to "treatment" runs through every stage of the processing with only the base of the head attached thereto, the base of the suction head serving not merely for the purpose of holding during the processing, but also for attachment to any kind of conveyor mechanism. It is, of course, understood, that this conveyor mechanism could also be the upper part of a suction head, conforming to the above described formation which, upon re-creating the vacuum can be re-connected to the lower part.

Experience has shown that the vacuum remains for a period of several hours duration, even up to as much as six hours, that is to say for a length of time that is adequate for all working processes.

This new mechanism is designed and utilised for the conveyance of pipes as well as any other kind of mouldings either in an upright or in a recumbent position. In the case of the conveyance of pipes in a recumbent position, the suction head extends longitudinally and is of "arched" development in strict conformity with the contour of the circumference of the pipe. So that it embraces an adequate part of the circumference of the pipe. In the same way, it is combined with a detachable upper part so that by leaving the lower part attached to the moulding, in the case of a "pipe" for example, work on the socket and the uppermost extremity thereof can be attended to by execution of the various working processes, during which processing appropriate holding mechanism can grip the suction head adhering firmly to the piece to be treated.

In the diagrammatic illustrations attached, by way of example various constructions of suction heads are represented by way of example in accordance with the invention.

Figs. 1 and 2 in the drawings show in vertical section and plan respectively the simplest form of construction of a suction head.

Figure 1:
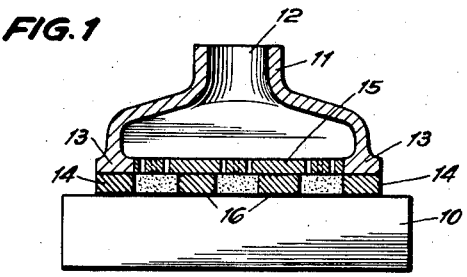
Figure 2:
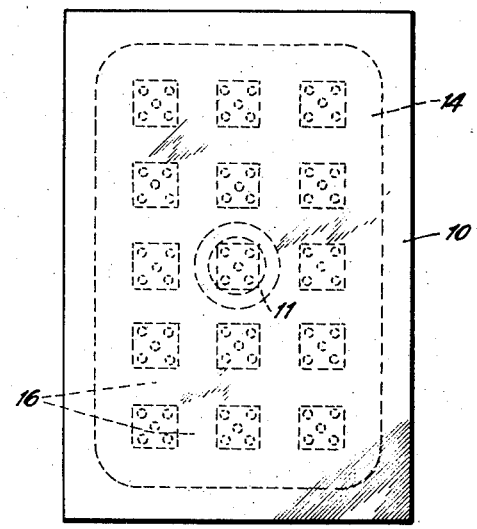

Figs. 1 and 2 diagrammatically illustrate a ceramic moulding 10 to which is applied a campaniform suction head 11 which is connected at 12 with a vacuum-conduit-pipe and has lower flanges 13 to which there is attached the sealing element 14 (consisting for example of soft rubber). The surface of the sealing material 14 resting on the piece to be treated is formed similarly to the surface of the article to be treated, and on which it will be placed. The sealing material 14 spreads—this is not shown in the illustration—appropriately directionally on the contact-surface of the article to be treated, and in its entirety forms a closed ring (which according to the example shown is oblong). A stiffening disc 15, which aligns with the flanges 13 (or even sinks in still further), and seals the suction head, is furnished with feet 16, which impinges on the surface of the mouldings and are evenly distributed, as may readily be seen from Fig. 2.

If the need arises, installations for ensuring more effective distribution of the vacuum can be arranged in the suction head 11.

Figure 3:
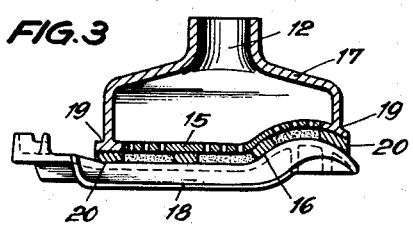
Fig. 3 is a vertical section of a suction head such as is required in the case of somewhat complicated mouldings.

Fig. 3 shows a suction head (for the sake of comparison) suitable for a thin ceramic piece of material of a somewhat complicated shape, as, for example, an unfinished roofing-tile, having a special "profile." As may be seen the suction head 17 is adapted precisely to the contours of the moulding 18; that is to say, the flanges 19 which carry the packing material and the packing material 20 are of corresponding construction.

In the case of suction heads with a comparatively large effective surface, it has been found advisable to create a space within the suction head itself which can be furnished with suitable devices to further the distribution of the vacuum, in order expressly to guarantee the most intensive and most even distribution of the negative pressure.

Figure 4:
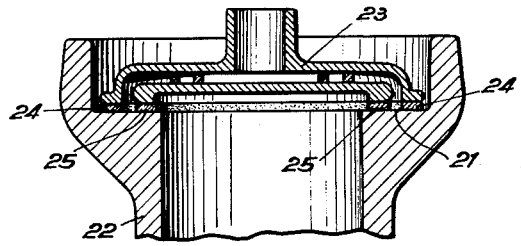
Fig. 4 is a vertical section illustrating the formation of the suction head for the conveyance of, say earthenware pipes in an upright position.

The suction head diagrammatically represented in Fig. 4, which is designed for conveyor installations for socketed pipe mouldings is differentiated from the previously described methods of construction by the arrangement of the packings of the flatly formed suction head 23 set up on the inner wall 21 in the socketed end of the pipe; such packing is effected by two ring-pads 24 and 25 arranged at intervals which between them form a suction chamber and lie contiguous thereto spread over as large a surface as possible—in so far as this is practicable having regard to the breadth of the interval between the ring-pads. It has been proved by experience that by means of such a contrivance, earthenware pipes of normal dimensions and weight can be both lifted and re-deposited in a manner that may be regarded as quite safe from the point of view of the working of the plant, without apprehension that they will become misshapen under stress. In Fig. 4 and in the other embodiments shown in Figs. 5 to 10, inclusive, it should be noted that the inner and outer members which support the pads and which define the suction chamber are of closed-form configuration, and that the portion of the suction head lying within the inner member constitutes a barrier so as to isolate the suction chamber from that portion of the work which is exposed to the area confined by the inner member.

Figure 5:
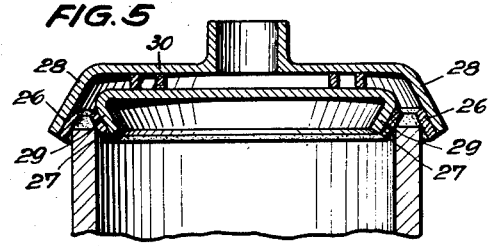
Fig. 5 is a vertical section of a suction head suitable for straight pipes.

Fig. 5 demonstrates a different form of the suction head, designed for the transport of straight (unsocketed) pipe mouldings. In this case a cylindrical space is created between the packing elements 26 and 27, which are slopingly arranged on correspondingly diverging carrying-parts 28 and 29 of the suction head 30, which cylindrical space spans the terminal ends of the pipes. The soft India-rubber packing rings 26 and 27 (which must be softer than the material employed for the making of the pipe mouldings which latter material may not be completely consolidated) press on the edges.

For the rest, the conformation of the suction head is substantially the same as those described in the previous diagrams.

Practical experience has further proved that, in this particular way, comparatively heavy ceramic pipes can be lifted and transported.

Figure 6:
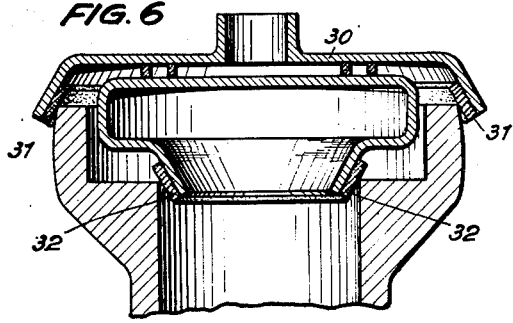
Figs. 6 and 7 show further methods of construction of suction head for socketed pipes.

Fig. 6 illustrates a form of the suction head similar to the one just described, showing its application to a socketed pipe. In each case, the inclined packing rings 31 and 32 impinge on the inner and outer edges of the pipe at different levels. The suction head which is shaped accordingly, is, in this case, partly introduced into the socketed end of the pipe. This form too, has been proved to be quite reliable.

Figure 7:
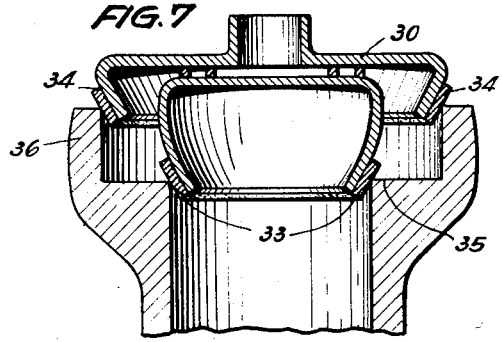

Fig. 7 shows a different design of suction contrivance for socketed earthenware pipes and similar articles, in which the packing rings 33 and 34 are not arranged divergently (as in Fig. 6) but rather are arranged co-linearly (that is sloping similarly) in such a manner that the inner packing-ring-pad 33 nestles snugly against the inner edge 35 of the pipe, whilst the outer packing ring-pad 24 abuts on the inner edge 36 of the socket. This conformation is in practice even more advantageous than the one shown in Fig. 6.

In all cases it is of vital importance that all parts of the moulding that are not embraced by the suction head, are not so large that, considering the elasticity of the moulding, they cease to be self-supporting, that is to say, it is essential to adopt precautions designed to obviate their becoming misshapen by their own gravity.

In the case of forms in accordance with Figs. 8–12, that part of the suction head which immediately contacts the moulding corresponds exactly with the form hitherto described.

Figure 8:
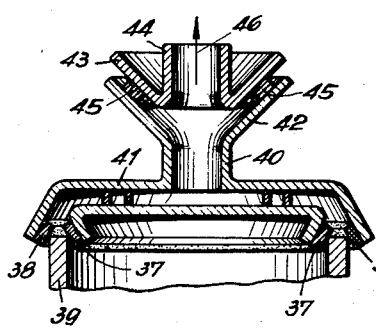
Fig. 8 is a further method of construction of the device as used on socketless pipes.
Figure 9:
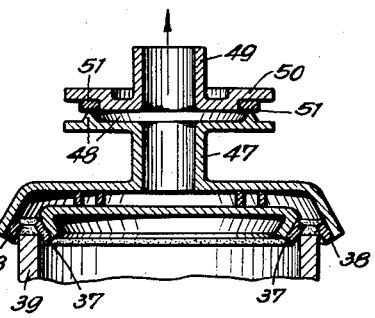
Fig. 9 is a somewhat modified form of construction of the mechanism in accordance with Fig. 8.

For instance, in the examples illustrated in Figs. 8 and 9, which are designed for the conveyance of un-socketed pipes, the two divergently arranged packing ring-pads 37 and 38 accommodate the edge of pipe 39 in the annular space between them.

The suction branch 40 of the base as illustrated in Fig. 8, runs into the funnel-shaped part 42 into which the correspondingly conical nether edges, of the upper part 44, fit, and are sealed off by ring-pad packing 45. As soon as the inner chamber of the suction head has been evacuated by the vacuum operating in the direction of the arrow 40 then parts 41 and 44 are closely linked, through the effect of the vacuum, and conveyance can thereupon be carried out.

When the vacuum is broken, then part 40 is divorced from part 44 and can stay on the moulding and should the need arise at any given later moment, can again be re-connected with part 44.

In the form shown in Fig. 9, the suction branch 47, at its upper end, has a ring-flange 48 and the upper part 49 also a ring-flange 50 which in accordance with the example accommodates the ring-pad packing 51 in a recess.

Figure 10:
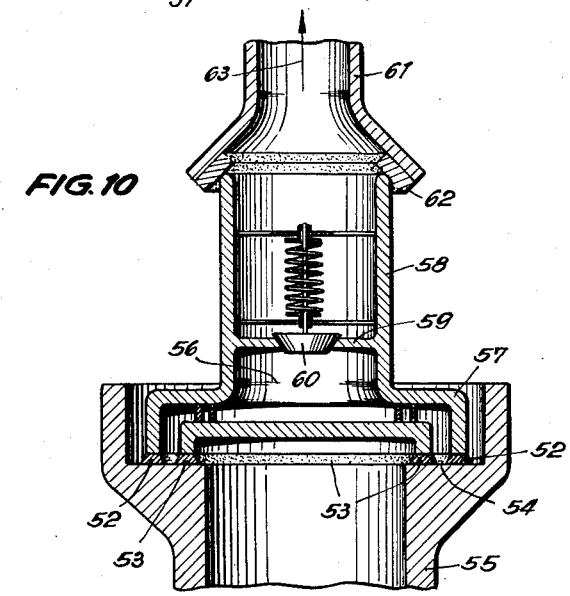
Fig. 10 shows the construction, generally preferred, of this particular mechanism with a non-return check-valve, as applicable to socketed pipes.

According to Fig. 10, the packings 52 and 53 which between them constitute an annular suction space rest on the inner ledge of the socket of the socketed pipe 55. The space 56 of the domelike base 57 to be evacuated is hood shaped and has been enlarged in contrast to the previously described construction expressly in order to produce a larger vacuum chamber, so that in the case of possible slight leakages adequate adherence is assured. The suction branch 58 is sealed off by a ring-flange 59 in which there is situated a non-return check valve 60. The top half 61 is sealed off by means of the ring-packing 62, and is placed on the appropriately vaulted frontal edge of the suction branch 58.

As soon as the inner chamber 56 has been evacuated in the direction shown by the arrow 63, the upper part 61 is linked with the base 57 and conveyance can forthwith begin. If, by allowing a current of air to stream into the upper part the vacuum is broken, then valve 61 "shuts" and part 61 separates from part 57, nevertheless, the chamber 56 remains a vacuum.

Now, the moulding may at any given moment be held by the lower part 57 and conveyed, either by means of some mechanical contrivances or subsequent to re-union with the upper part, in all instances without incurring the danger of sustaining injury, which is always to be apprehended whenever mechanical appliances and holding devices attaching directly to the moulding are employed.

Figure 11:
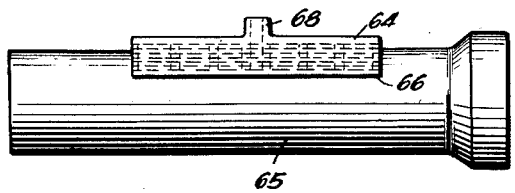
Figs. 11 and 12 show in elevation and plan a suction head for the conveyance and holding of, say, earthenware pipes in a recumbent position.
Figure 12:
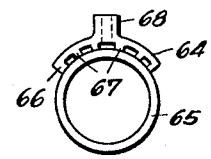

According to Figures 11 and 12, a device is illustrated for transporting ceramic tubes in a horizontal position, and in this instance, suction is not applied to an interior shoulder as, for example, in the form shown in Figure 10. On the contrary, the suction head 64 is elongated and curved to conform to the curvature of the surface of the tube or tile 65. On the face of the head are side ribs 66 extending from end to end and a plurality of spaced intermediate rigs periodically interrupted so that the suction from the neck 68 is properly distributed throughout. The remaining packing structure will be understood as similar to that above described.

The examples illustrated show that the principle of this invention can be applied to mouldings of the most varied description. The invention is, of course, not confined to the individual forms described separately with reference to the diagrammatically illustrated examples of suction heads; but that, according to the purposes for which it is to be used, the invention can be modified in various ways without departing from the basic idea.

I claim:

1. A suction head for attachment to a plastic moulding comprising a lower part, having a lower edge shaped to embrace an area of the moulding, a packing ring of elastic material surrounding said lower edge, an upper part, separable from the lower part, a packing ring between said upper and lower parts effecting a connection between said parts when said head is evacuated, and a conduit through which said head may be evacuated.

2. A suction head for attachment to a plastic moulding comprising a lower part, having a lower edge shaped to embrace an area of the moulding, a packing ring of elastic material surrounding said lower edge, an upper part, means to connect said upper and lower parts, and a conduit through which said lower part may be evacuated, and a non-return valve in said lower part operating to maintain the vacuum in said lower part when said upper part is disconnected.

3. A suction head for attachment to a plastic moulding comprising a lower part, having a lower edge shaped to embrace an area of the moulding, a packing ring of elastic material surrounding said lower edge, an upper part, separable from the lower part, a packing ring between said upper and lower parts effecting a connection between said parts when said head is evacuated, a conduit through which said head may be evacuated, and a non return valve in said lower part operating to maintain the vacuum in said lower part when said upper part is disconnected.

4. In a vacuum conveyer installation a suction head comprising an upper part and a lower part, said lower part carrying elastic packing material adapted to engage an article to be conveyed, elastic sealing material interposed between said upper and lower parts to form an air tight joint between them, and means to establish a vacuum in said upper and lower parts.

5. A suction head for attachment to a plastic moulding comprising a lower part defining an annular suction chamber, a conduit through which said annular chamber may be evacuated, packing rings of elastic material surrounding the lower edges of said annular chamber and adapted to seal said chamber against an annular area of the moulding, an upper part, and a packing ring between said upper and lower parts effecting a connection between said parts when said chamber is evacuated.

6. A suction head for attachment to a plastic moulding comprising a lower part defining an annular suction chamber, a conduit through which said annular chamber may be evacuated, packing rings of elastic material surrounding the lower edges of said annular chamber and adapted to seal said chamber against an annular area of the moulding, an upper part, and a packing ring between said upper and lower parts effecting a connection between said parts when said chamber is evacuated, and a non return valve in said lower part operating to maintain the vacuum in said lower part when said upper part is disconnected.

7. A suction head for attachment to plastic and semi-plastic mouldings, comprising a body having thereon spaced rigid inner and outer members of closed configuration defining therebetween a suction chamber of closed configuration adapted at the free edges of the members to engage over and apply suction to an area of said moulding opposite said chamber and bounded by said inner and outer members, means for holding said inner and outer members at a fixed distance from each other, a conduit leading to said chamber through which said chamber may be evacuated, said body including a barrier bounded by said inner member, said barrier isolating said chamber from all areas of said moulding exposed to the portions of said body other than those between said inner and outer members, and packing rings of elastic material on said members for engaging said moulding, said packing rings being on the free edges of said members.

8. A suction head for attachment to plastic and semi-plastic mouldings, comprising a body having thereon spaced rigid inner and outer members of closed configuration defining therebetween a suction chamber of closed configuration adapted at the free edges of the members to engage over and apply suction to an area of said moulding opposite said chamber and bounded by said inner and outer members, means for holding said inner and outer members at a fixed distance from each other, a conduit leading to said chamber through which said chamber may be evacuated, said body including a barrier bounded by said inner member, said barrier isolating said chamber from all areas of said moulding exposed to the portions of said body other than those between said inner and outer members, and packing rings of elastic material on said members for engaging said moulding, said packing rings being on the outer sides of said members.

9. A suction head for attachment to plastic and semi-plastic mouldings, comprising a body having thereon spaced rigid inner and outer members of closed configuration defining therebetween a suction chamber of closed configuration adapted at the free edges of the members to engage over and apply suction to an area of said moulding opposite said chamber and bounded by said inner and outer members, means for holding said inner and outer members at a fixed distance from each other, a conduit leading to said chamber through which said chamber may be evacuated, said body including a barrier bounded by said inner member, said barrier isolating said chamber from all areas of said moulding exposed to the portions of said body other than those between said inner and outer members, and packing rings of elastic material on said members for engaging said moulding, one of said packing rings being on the outer side of one of said members, another of said packing rings being on the inner side of the other member.

10. A suction head for attachment to plastic and semi-plastic mouldings, comprising a body having thereon spaced rigid inner and outer members of closed configuration defining therebetween a suction chamber of closed configuration adapted at the free edges of the members to engage over and apply suction to an area of said moulding opposite said chamber and bounded by said inner and outer members, means for holding said inner and outer members at a fixed distance from each other, a conduit leading to said chamber through which said chamber may be evacuated, said body including a barrier bounded by said inner member, said barrier isolating said chamber from all areas of said moulding exposed to the portions of said body other than those between said inner and outer members, and packing rings of elastic material on said members for engaging said moulding, one of the packing rings being on the outer side of the inner member, the other packing ring being on the inner side of the outer member.

11. A suction head for attachment to plastic and semi-plastic mouldings, comprising a body having thereon downwardly dependent spaced rigid inner and outer members of closed configuration defining therebetween a suction chamber of closed configuration adapted to engage over and apply suction to an area of said moulding opposite said chamber and bounded by said inner and outer members, means for holding said inner and outer members at a fixed distance from each other, the side walls of said outer member diverging downwardly, the side walls of said inner member converging downwardly, a conduit leading to said chamber through which said chamber may be evacuated, said members having frusto-conical side walls, and packing rings of elastic material disposed on said side walls.

12. A suction head for attachment to plastic and semi-plastic mouldings, comprising a body having thereon downwardly dependent spaced rigid inner and outer members of closed configuration defining therebetween a suction chamber of closed configuration adapted to engage over and apply suction to an area of said moulding opposite said chamber and bounded by said inner and outer members, means for holding said inner and outer members at a fixed distance from each other, the side walls of said members converging downwardly in the same sense, a conduit leading to said chamber through which said chamber may be evacuated, said members having frusto-conical side walls, and packing rings of elastic material disposed on said side walls.

13. A suction head for attachment to plastic and semi-plastic mouldings, comprising a body having thereon downwardly dependent spaced rigid inner and outer members of closed configuration defining therebetween a suction chamber of closed configuration adapted to engage over and apply suction to an area of said moulding opposite said chamber and bounded by said inner and outer members, means for holding said inner and outer members at a fixed distance from each other, the side walls of said rigid members being divergent with respect to one another, a conduit leading to said chamber through which said chamber may be evacuated, said members having frusto-conical side walls, and packing rings of elastic material disposed on said side walls.

References Cited in the file of this patent

UNITED STATES PATENTS

| 1,251,258 | Magill | Dec. 25, 1917 |
| 1,315,737 | Milmoe | Sept. 9, 1919 |
| 1,532,255 | Miller | Apr. 7, 1925 |
| 2,042,372 | Watson | May 26, 1936 |
| 2,523,157 | Somma | Sept. 19, 1950 |
| 2,557,260 | Clark | June 19, 1951 |

FOREIGN PATENTS

| 680,454 | Great Britain | Apr. 18, 1950 |
| 718,456 | Great Britain | Nov. 17, 1954 |